(12) United States Patent
Sawaski

(10) Patent No.: US 8,482,409 B2
(45) Date of Patent: Jul. 9, 2013

(54) SYSTEM AND METHOD FOR CONVEYING STATUS INFORMATION REGARDING AN ELECTRONIC FAUCET

(75) Inventor: Joel D Sawaski, Indianapolis, IN (US)

(73) Assignee: Masco Corporation of Indiana, Indianapolis, IN (US)

( * ) Notice: Subject to any disclaimer, the term of this patent is extended or adjusted under 35 U.S.C. 154(b) by 902 days.

(21) Appl. No.: 12/621,634

(22) Filed: Nov. 19, 2009

(65) Prior Publication Data

US 2011/0114187 A1 May 19, 2011

(51) Int. Cl.
- *G08B 21/00* (2006.01)
- *G08B 5/22* (2006.01)
- *F17D 3/00* (2006.01)
- *F16K 31/48* (2006.01)
- *A47K 1/00* (2006.01)

(52) U.S. Cl.
USPC ............ 340/540; 137/624.15; 137/624.2; 137/624.12; 4/626; 340/7.61; 340/7.6

(58) Field of Classification Search
None
See application file for complete search history.

(56) References Cited

U.S. PATENT DOCUMENTS

| | | | |
|---|---|---|---|
| 4,762,273 A | 8/1988 | Gregory et al. | |
| 5,089,144 A | 2/1992 | Ozkahyaoglu et al. | |
| 5,226,629 A | 7/1993 | Millman et al. | |
| 5,358,177 A | 10/1994 | Cashmore | |
| 5,624,409 A | 4/1997 | Seale | |
| 5,676,824 A | 10/1997 | Jeon et al. | |
| 5,819,336 A | 10/1998 | Gilliam et al. | |
| 5,823,229 A | 10/1998 | Bertrand et al. | |
| 5,845,844 A | 12/1998 | Zosimodis | |
| 5,961,095 A | 10/1999 | Schrott | |
| 6,129,103 A * | 10/2000 | Fields et al. | 137/1 |
| 6,250,601 B1 | 6/2001 | Kolar et al. | |
| 6,273,394 B1 | 8/2001 | Vincent et al. | |
| 6,975,216 B2 * | 12/2005 | Tharman et al. | 340/438 |
| 7,000,850 B2 | 2/2006 | Lin | |
| 7,094,334 B1 | 8/2006 | Guzman et al. | |
| 7,326,334 B2 | 2/2008 | Boyd et al. | |
| 2001/0040121 A1 | 11/2001 | Giordano et al. | |
| 2003/0221250 A1 | 12/2003 | Gibson et al. | |
| 2005/0098485 A1 | 5/2005 | Boyd et al. | |
| 2005/0133100 A1 | 6/2005 | Bolderheij et al. | |
| 2005/0150556 A1 | 7/2005 | Jonte | |
| 2005/0236493 A1 | 10/2005 | Lin | |
| 2005/0253102 A1 * | 11/2005 | Boilen | 251/129.04 |
| 2006/0006354 A1 | 1/2006 | Guler et al. | |
| 2006/0213561 A1 | 9/2006 | Tiwet | |
| 2006/0231638 A1 | 10/2006 | Belz et al. | |
| 2007/0057215 A1 | 3/2007 | Parsons et al. | |
| 2007/0138421 A1 | 6/2007 | Gibson et al. | |
| 2007/0192954 A1 | 8/2007 | Giagni | |
| 2007/0204925 A1 | 9/2007 | Bolderheij et al. | |
| 2007/0246550 A1 | 10/2007 | Rodenbeck et al. | |
| 2008/0078019 A1 | 4/2008 | Allen, Jr. et al. | |
| 2008/0099088 A1 * | 5/2008 | Boey | 137/624.11 |
| 2008/0271238 A1 | 11/2008 | Reeder et al. | |
| 2009/0119832 A1 | 5/2009 | Conroy | |
| 2009/0126810 A1 | 5/2009 | Currie | |

* cited by examiner

*Primary Examiner* — Jennifer Mehmood
*Assistant Examiner* — Pameshanand Mahase
(74) *Attorney, Agent, or Firm* — Faegre Baker Daniels LLP

(57) ABSTRACT

An electronic faucet has controller is configured to selectively open and close a valve to provide fluid flow through the valve and a passageway of the faucet. The controller is programmed to monitor a maintenance condition of the electronic faucet and to selectively open and close the valve to generate a fluid flow pattern through the passageway to provide an indication to a user of an existing maintenance condition.

29 Claims, 7 Drawing Sheets

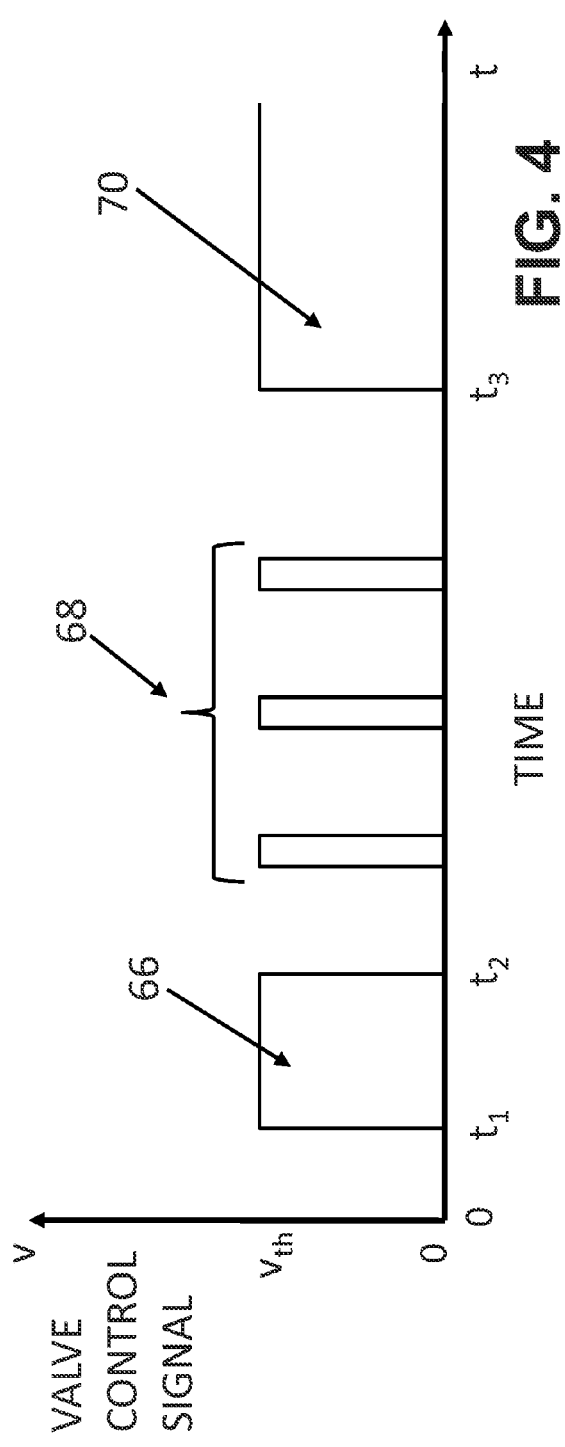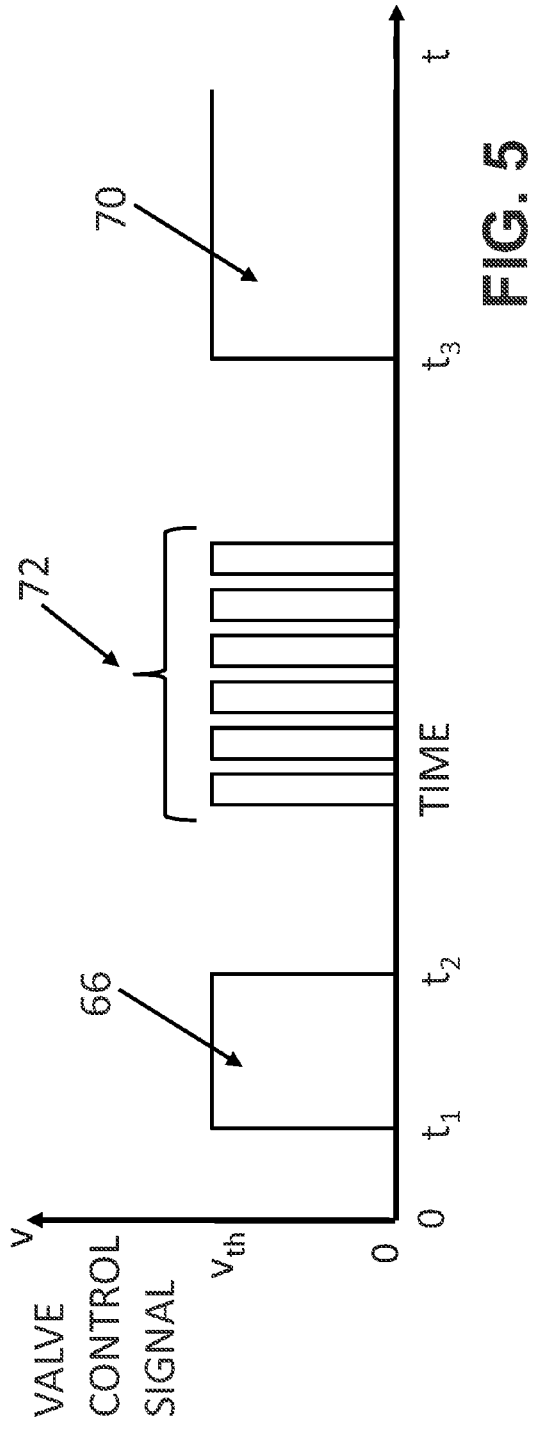

SYSTEM AND METHOD FOR CONVEYING STATUS INFORMATION REGARDING AN ELECTRONIC FAUCET

BACKGROUND AND SUMMARY OF THE INVENTION

The present invention relates generally to electronic faucets. More particularly, the present invention relates to systems and methods for conveying status information regarding the electronic faucets to users of the faucets.

Electronic faucets are often used to control fluid flow. Electronic faucets typically include proximity sensors such as active infrared ("IR") proximity detectors or capacitive proximity sensors. Such proximity sensors are used to detect a user's hands positioned near the faucet and turn the water on and off in response to detection of the user's hands. Other electronic faucets use touch sensors to control the faucet. Such touch sensors include capacitive touch sensors or other types of touch sensors located on a spout of the faucet or on a handle for controlling the faucet.

Electronic faucets often use batteries as a primary or secondary power source for a controller of the electronic faucet. The batteries must be replaced or recharged from time to time as the battery level decreases. Electronic faucets may require other maintenance such as replacement of water filters in the faucet, for example. In addition, the controller of the electronic faucet may monitor system performance and determine when the faucet needs maintenance or servicing. For example, the controller can monitor the IR sensor, the capacitive sensors, a temperature sensor, or other system components and provide an indication if any of these components need maintenance and/or servicing.

The system and method of the present disclosure use the flow of fluid through the faucet to convey status information to a user. By controlling fluid flow, such as delaying the start of fluid flow and/or providing a series of fluid pulses, the present system and method provides an inexpensive and noticeable communication method to convey status information from the faucet to the user. The controller of the faucet illustratively opens and closes a valve of the faucet in predetermined patterns to convey the different status information to the user. In an illustrated embodiment, delaying or pulsing the fluid flow may provide a nuisance to encourage the user to perform maintenance or servicing, such as changing the battery or the filter.

In one illustrated embodiment of the present disclosure, a method of controlling fluid flow from an electronic faucet is provided. The electronic faucet has having a spout, a passageway configured to conduct fluid flow through the spout, and an electrically operable valve in fluid communication with the passageway. The method comprises monitoring at least one maintenance condition of the electronic faucet, receiving a signal to open the valve and permit fluid flow through the passageway, and controlling opening and closing of the valve in response to the signal to generate a fluid flow pattern through the passageway that provides an indication to a user of an existing maintenance condition for the electronic faucet.

In another illustrated embodiment of the present disclosure, an electronic faucet comprises a spout, a passageway configured to conduct fluid flow through the spout, an electrically operable valve in fluid communication with the passageway, and a controller coupled to the valve. The controller is configured to selectively open and close the valve to provide fluid flow through the valve and the passageway of the spout. The controller is programmed to monitor a maintenance condition of the electronic faucet and to selectively open and close the valve to generate a fluid flow pattern through the passageway to provide an indication to a user of an existing maintenance condition.

In one illustrated embodiment, the fluid flow pattern includes a time delay between receipt of the signal and an opening of the valve. The time delay provides an indication to the user of the existing maintenance condition. In another illustrated embodiment, the fluid flow pattern includes a plurality of fluid pulses having a pattern indicative of the existing maintenance condition.

In yet another illustrated embodiment of the present disclosure, the electronic faucet includes a battery power supply and the at least one monitored maintenance condition includes a battery level of the battery. The fluid flow pattern provides an indication to the user when the battery level falls below a predetermined level.

In still another illustrated embodiment, a plurality of different maintenance conditions are monitored. The controller is programmed to provide a different fluid flow pattern for each of the different monitored maintenance conditions.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 4 is a timing diagram illustrating a signal supplied by a controller of the electronic faucet to open and close an actuator driven valve of the faucet thereby providing a series of fluid pulses to provide status information to the user;

FIG. 5 is a timing diagram similar to FIG. 4 showing a signal to provide a different pattern of fluid pulses for providing different status information to the user;

DETAILED DESCRIPTION OF THE DRAWINGS

Figure 1:
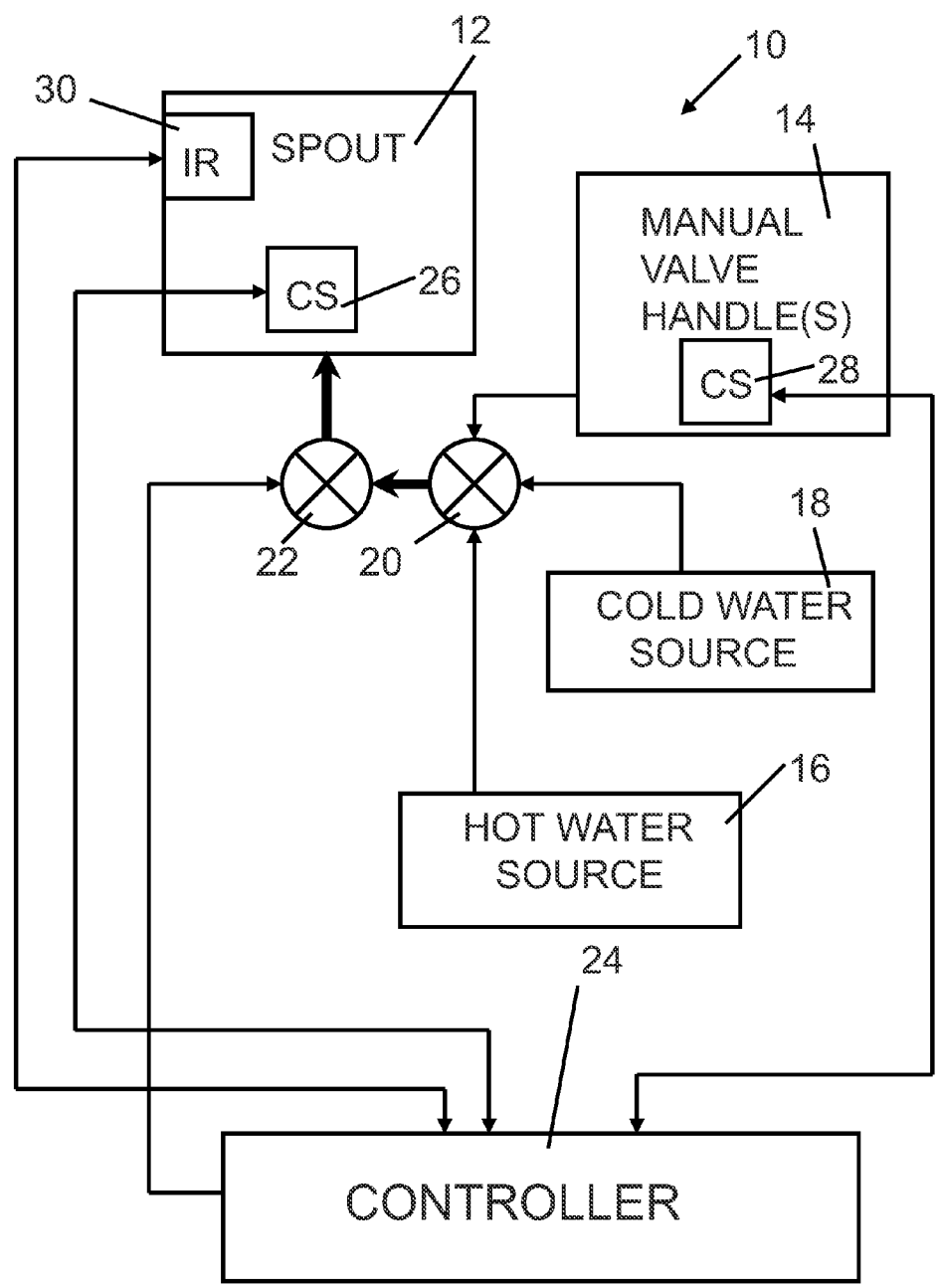
FIG. 1 is a block diagram of an illustrated embodiment of an electronic faucet.

For the purposes of promoting an understanding of the principles of the present disclosure, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. Therefore, no limitation of the scope of the claimed invention is thereby intended. The present invention includes any alterations and further modifications of the illustrated devices and described methods and further applications of the principles of the invention which would normally occur to one skilled in the art to which the invention relates.

FIG. 1 is a block diagram illustrating one embodiment of an electronic faucet system 10 of an illustrated embodiment of the present disclosure. The system 10 includes a spout 12 for delivering fluids such as water and at least one manual valve handle 14 for controlling the flow of fluid through the spout 12 in a manual mode. A hot water source 16 and cold water source 18 are coupled to a valve body assembly 20. In one illustrated embodiment, separate manual valve handles 14 are provided for the hot and cold water sources 16, 18. In other embodiments, such as a kitchen embodiment, a single manual valve handle 14 is used for both hot and cold water delivery. In such kitchen embodiment, the manual valve handle 14 and spout 12 are typically coupled to a basin through a single hole mount. An output of valve body assembly 20 is coupled to an actuator driven valve 22 which is controlled electronically by input signals received from a controller 24. In an illustrative embodiment, actuator driven valve 22 is a solenoid valve such as a magnetically latching pilot-controlled solenoid valve, for example.

In an alternative embodiment, the hot water source 16 and cold water source 18 may be connected directly to actuator driven valve 22 to provide a fully automatic faucet without any manual controls. In yet another embodiment, the controller 24 controls an electronic proportioning valve (not shown) to supply fluid to the spout 12 from hot and cold water sources 16, 18.

Because the actuator driven valve 22 is controlled electronically by controller 24, flow of water can be controlled using outputs from sensors such as capacitive sensors 26, 28 and/or an infrared (IR) sensor 30. As shown in FIG. 1, when the actuator driven valve 22 is open, the faucet system 10 may be operated in a conventional manner, i.e., in a manual control mode through operation of the handle(s) 14 and the manual valve member of valve body assembly 20. Conversely, when the manually controlled valve body assembly 20 is set to select a water temperature and flow rate, the actuator driven valve 22 can be touch controlled, or activated by proximity sensors when an object (such as a user's hands) are within a detection zone to toggle water flow on and off.

In one illustrated embodiment, spout 12 may have capacitive sensors 26 and/or an IR sensor 30 connected to controller 24. In addition, the manual valve handle(s) 14 may also have capacitive sensor(s) 28 mounted thereon which are electrically coupled to controller 24. It is understood that other suitable sensors may be used to detect proximity or touch to control the faucet.

The output signals from capacitive sensors 26, 28 and/or IR sensor 30 may be used to control actuator driven valve 22 which thereby controls flow of water to the spout 12 from the hot and cold water sources 16 and 18. By sensing capacitance changes with capacitive sensors 26, 28, the controller 24 can make logical decisions to control different modes of operation of system 10 such as changing between a manual mode of operation and a hands free mode of operation as described in U.S. application Ser. Nos. 11/641,574; 10/755,581; 11/325,128; and PCT International Application Serial No. PCT/US2008/01288, the disclosures of which are all expressly incorporated herein by reference. Another illustrated configuration for a proximity detector and logical control for the faucet in response to the proximity detector is described in greater detail in U.S. patent application Ser. No. 10/755,582, which is hereby incorporated by reference in its entirety.

The amount of fluid from hot water source 16 and cold water source 18 is determined based on one or more user inputs, such as desired fluid temperature, desired fluid flow rate, desired fluid volume, various task based inputs, various recognized presentments, and/or combinations thereof. As discussed above, the system 10 may also include electronically controlled mixing valve which is in fluid communication with both hot water source 16 and cold water source 18. Exemplary electronically controlled mixing valves are described in U.S. patent application Ser. No. 11/109,281 and PCT International Application Serial No. PCT/US2007/060512, the disclosures of which are expressly incorporated by reference herein.

Figure 2:
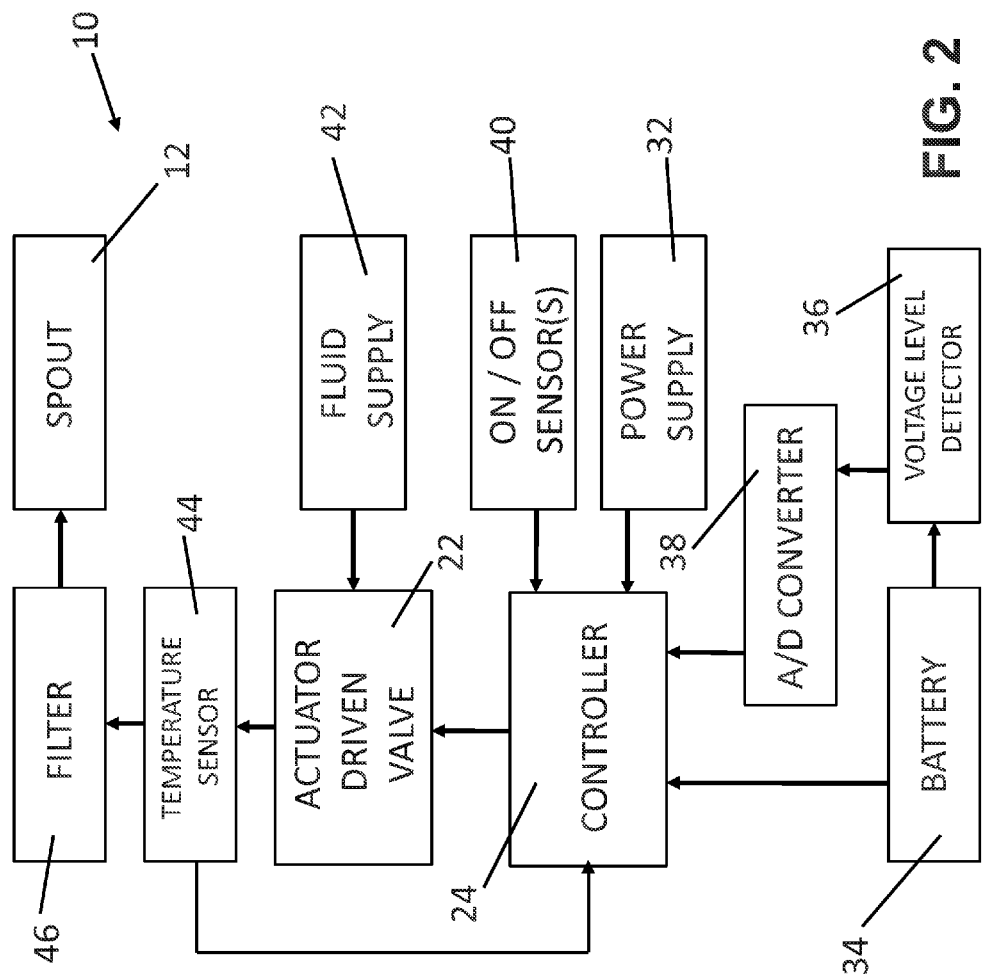
FIG. 2 is a block diagram illustrating further details of the electronic faucet of an illustrated embodiment of the present disclosure.

Additional details of an exemplary embodiment of the electronic faucet are illustrated in FIG. 2. The electronic faucet 10 may be connected to a building power supply 32 and/or to a battery power supply 34. In other words, the battery 34 may either provide a primary power supply or a backup power supply to the controller 24. In an illustrated embodiment of the present invention, a battery level detector 36 is provided. The level detector illustratively includes a voltage level detector 36 connected to the battery 34, and an analog-to-digital (A/D) converter 38 coupled between the voltage level detector 36 and the controller 24.

In FIG. 2, on/off sensors 40 are shown coupled to controller 24. As discussed above, these sensors 40 may illustratively include capacitive or infrared sensors, or other suitable sensors, for detecting touch or proximity of a user adjacent the faucet 10. Also in FIG. 2, a fluid supply 42 is coupled to actuator driven valve 22. Fluid supply 42 may include the valve body assembly 20 and hot and cold water sources 16 and 18 as discussed above.

In the FIG. 2 embodiment, a temperature sensor 44 and filter 46 are provided between the actuator driven valve 22 and the spout 12. The temperature sensor 44 provides a signal to controller 24 indicating the temperature of fluid flowing through the actuator driven valve 22 to the spout 12. Controller 24 may include a counter to determine when filter 46 needs to be replaced.

Figure 3:
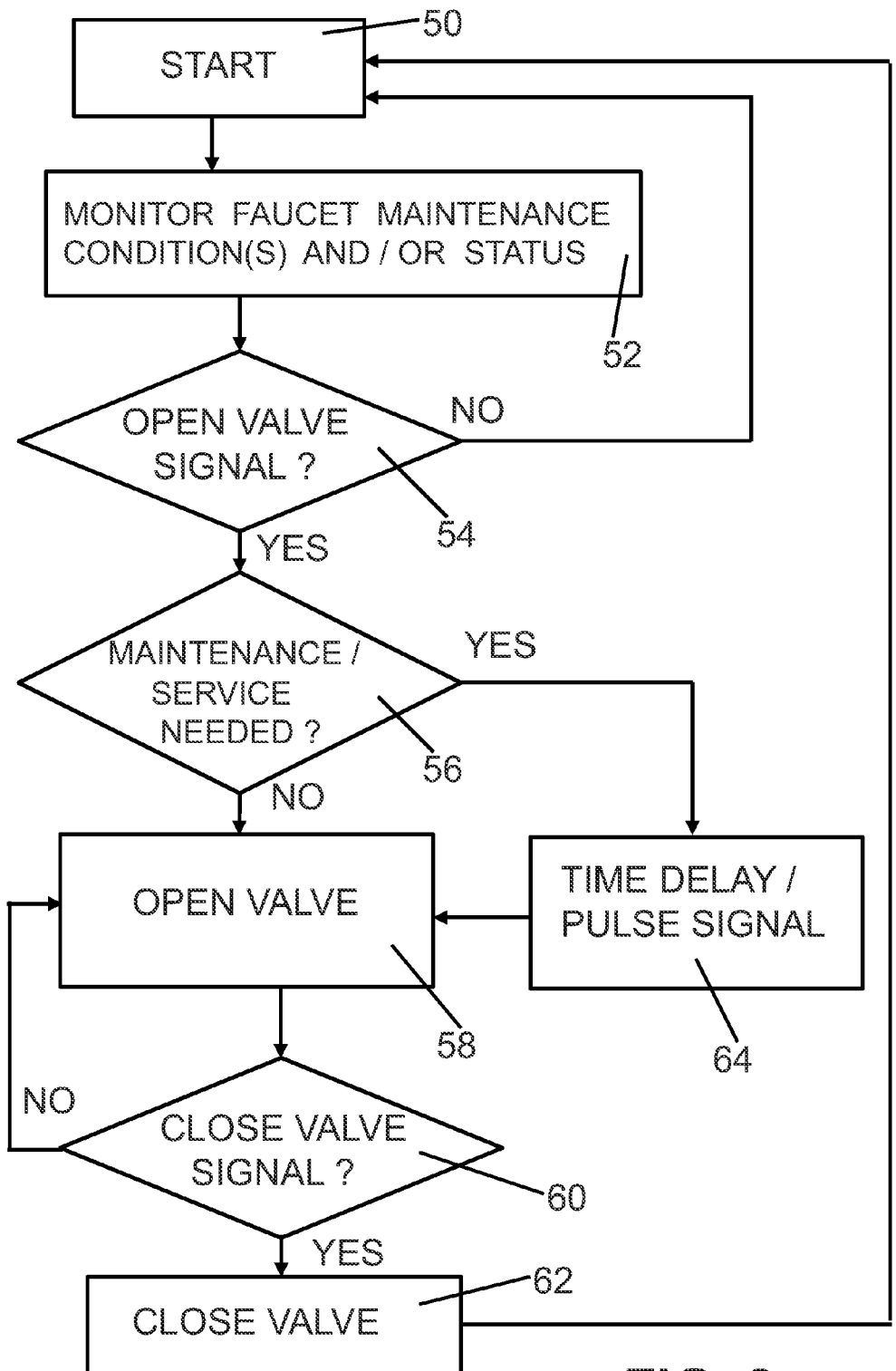
FIG. 3 is a flow chart illustrating the steps performed by the electronic faucet to monitor faucet status and/or maintenance conditions and provide status information to a user.

In an illustrated embodiment of the present disclosure, a system and method are provided for monitoring the status of the electronic faucet and/or needed maintenance conditions for the electronic faucet as illustrated in FIG. 3. Controller 24 operates as shown in FIG. 3 to provide the status information to the user. Operation begins at block 50. The controller 24 monitors faucet status and/or maintenance conditions as illustrated at block 52. For example, the controller 24 monitors the battery level 34, the need to replace filter 46, or other desired or needed maintenance conditions for the electronic faucet 10. The controller 24 may also monitor operation of various components of the electronic faucet 10 and provide status information if one of the components needs servicing.

Controller 24 monitors signals from the on/off sensors 40 and determines when to open the actuator driven valve 22 and permit fluid flow as illustrated at block 54. If the controller 24 does not receive a signal from sensors 40 to open the actuator driven valve 22, controller 24 returns to block 50 to continue monitoring the sensors 40. If controller 24 receives a signal from on/off sensors 40 to open the actuator driven valve 22 at block 54, controller 24 then checks whether maintenance or service of the electronic faucet is needed as illustrated at block 56. If maintenance or services is not needed at block 56, controller opens the actuator driven valve 22 to permit fluid flow from the fluid supply 42 to the spout 12 as illustrated at block 58. Controller 24 then monitors sensors 40 to determine when to close the actuator driven valve 22 and shut off fluid flow as illustrated at block 60. If controller 24 does not receive a signal to close the valve 22, the valve 22 remains open. If the controller 24 does receive a signal to close the valve 22, the valve 22 is closed as illustrated at block 62 and controller 24 returns to block 50 to wait for the next control signal from sensors 40.

If maintenance or servicing of the electronic faucet is needed at block 56, the controller 24 controls the actuator driven valve 22 to provide a predetermined pattern of fluid pulses to provide an indication to the user of the need for maintenance or service as illustrated at block 64. For example, if maintenance or service is needed, the controller 24 may provide an output signal such as shown in FIG. 4 to the actuator driven valve 22. In the illustrated embodiment, a voltage is supplied to the valve 22 to provide an initial pulse of fluid between time $t_1$ and $t_2$ as shown by pulse 66. Controller 24 then provides a series of three pulses 68 to provide an indication of a particular status, maintenance condition or service condition of the faucet 10. After the status information is provided by pulses 68, the controller 24 supplies actuator driven valve 22 with a continuous signal to keep the valve 22 open beginning at time $t_3$ as shown at location 70. Controller 24 maintains the valve 22 open until controller 24 receives an indication from sensors 40 to shut off the fluid flow.

FIG. 5 illustrates another pattern of status information provided by the controller 24. Controller 24 pulses fluid flow by opening and closing the actuator driven valve 22 in a different pattern. In FIG. 5, the controller 24 provides the initial pulse 66 between time $t_1$ and $t_2$ similar to the FIG. 4 embodiment. However, as shown in FIG. 5, a series of six pulses 72 are generated to provide a different status, maintenance or servicing condition indication to the user before the controller 24 opens the actuator driven valve 22 and keeps it open at time $t_3$ as shown at pulse 70.

The different patterns of fluid pulses 68 and 72 provide indications of different status, maintenance or servicing conditions of the electronic faucet 10. It is understood that a plurality of different pulse patterns may be provided although only two such pulse patterns are shown in FIGS. 4 and 5 for illustrative purposes. For example, the pattern 68 shown in FIG. 4 may indicate that the battery 34 has a low battery level and needs to be replaced or recharged. A series of pulses 68 or 72 may provide an indication that a filter 46 needs to be replaced. As discussed above, controller 24 may also include diagnostic features to check operation of various components of the electronic faucet 10. The series of pulses 68 or 72 may provide the user with fault codes, error codes, system status or other indication of which components of the electronic faucet are malfunctioning or that need to be serviced or replaced. The particular pulsing patterns corresponding to particular maintenance or servicing conditions may be stored in a database or table in a memory accessible by controller 24.

Figure 6:
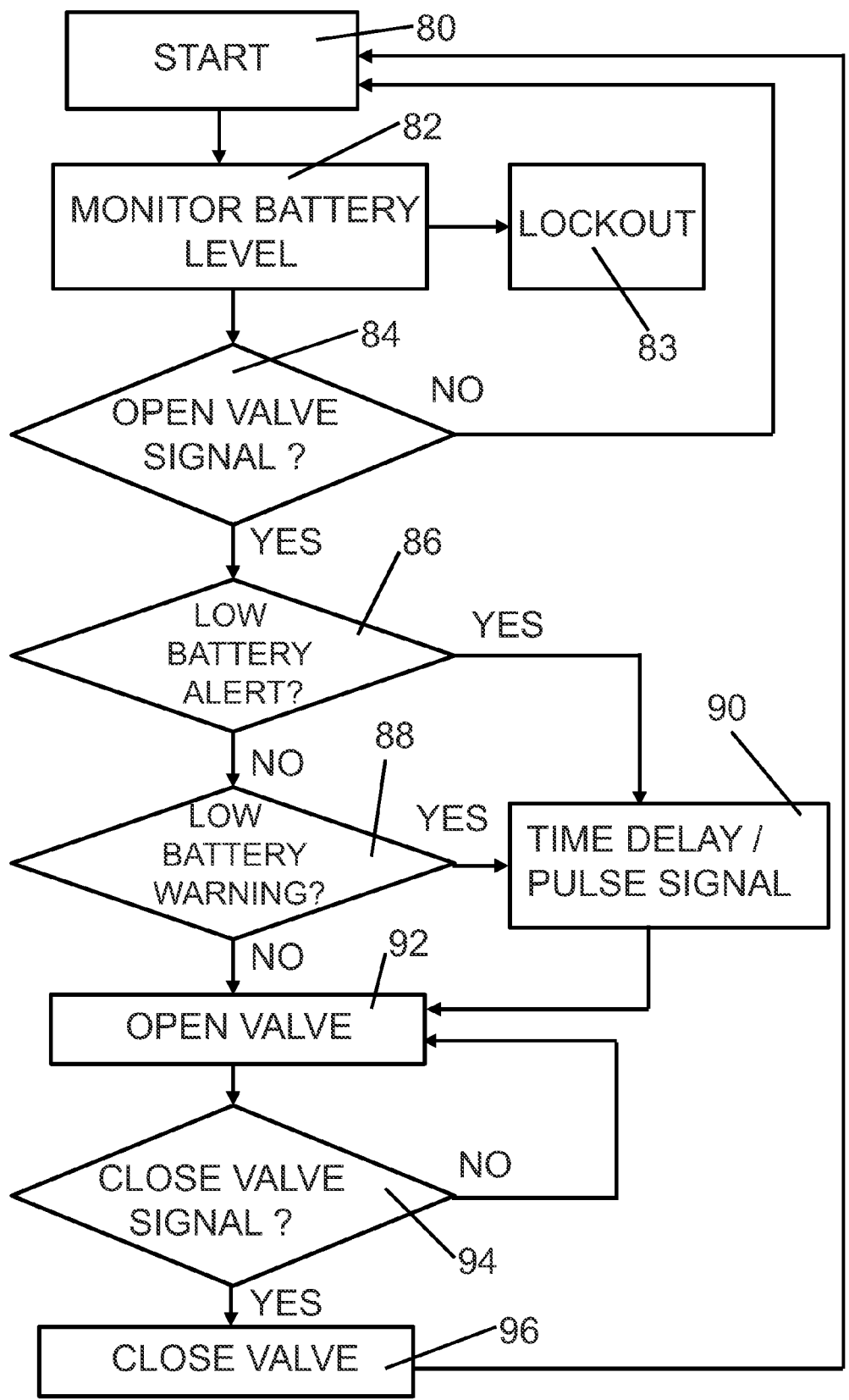
FIG. 6 is a flow chart illustrating the steps performed by the electronic faucet to monitor a battery level and provide a status information related to the battery level to the user.

FIG. 6 illustrates an exemplary embodiment for monitoring the level of battery 34 and providing a status indication to the user related to the battery level. Operation begins at block 80. Controller 24 monitors the battery level as illustrated at block 82. For example, controller 24 receives an indicator of the voltage level of the battery 34 from voltage level detector 36 and A/D converter 38. The system 10 provides an indication to the user when the battery level falls below a predetermined level and needs replacement or recharging.

In an illustrated embodiment, the controller 24 detects a normal battery level, a low battery warning level, a low battery alert level, or a lockout level in which the battery level is too low for continued operation of the electronic faucet 10. The normal battery level range is typically greater than about 1.10 volts per cell. Illustratively, the "low battery warning" level occurs when the battery level falls to a level between about 1.10 volts per cell and about 1.05 volts per cell. The "low battery alert" level occurs when the battery level falls to a level between about 1.05 volts per cell and about 1.00 volts per cell. The "lockout" level occurs when the battery level falls below about 1.00 volts per cell. If a lockout level is detected at block 82, controller 24 will not actuate actuator driven valve 22 in response to sensor inputs and locks out the controls as illustrated at block 83.

If the lockout battery level is not reached, controller 24 monitors for signals from on/off sensors 40 to open the valve 22 as illustrated at block 84. If no signals are received from sensors 40 at block 84, controller 24 returns to block 80. If the controller 24 receives input from sensors 40 to open the valve 22, controller 24 determines, based on the monitored battery level, whether a low battery alert condition has occurred as illustrated at block 86. If a low battery alert condition has occurred at block 86, controller 24 initiates a time delay and/or signal pulsation at block 90 as discussed in detail below. If a low battery alert condition does not exist at block 86, controller 24 determines whether a low battery warning condition exists as illustrated at block 88. If a low battery warning condition exists, the controller 24 initiates a different pulsing pattern and/or time delay as illustrated at block 90. If a low battery warning level condition is not detected at block 88, controller 24 opens the actuator driven valve 22 to provide fluid flow as illustrated at block 92. Controller 24 then monitors sensors 40 to determine when controller 24 should close the valve 22 as illustrated at block 94. If no such signals from sensors 40 are received, the valve 22 remains open. When controller 24 receives an indication from sensors 40 to close the valve 22, the valve 22 is closed as illustrated at block 96.

Figure 7:
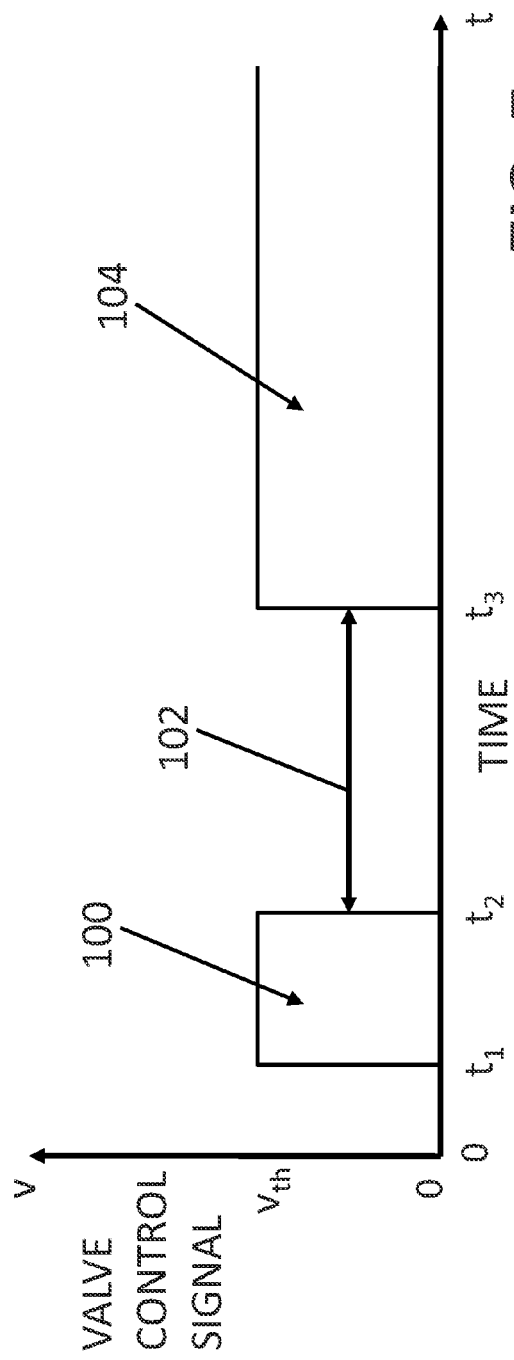
FIGS. 7 and 8 are timing diagrams showing signals from the controller to open and close of the actuator driven valve to provide indications of different battery levels to the user.
Figure 8:
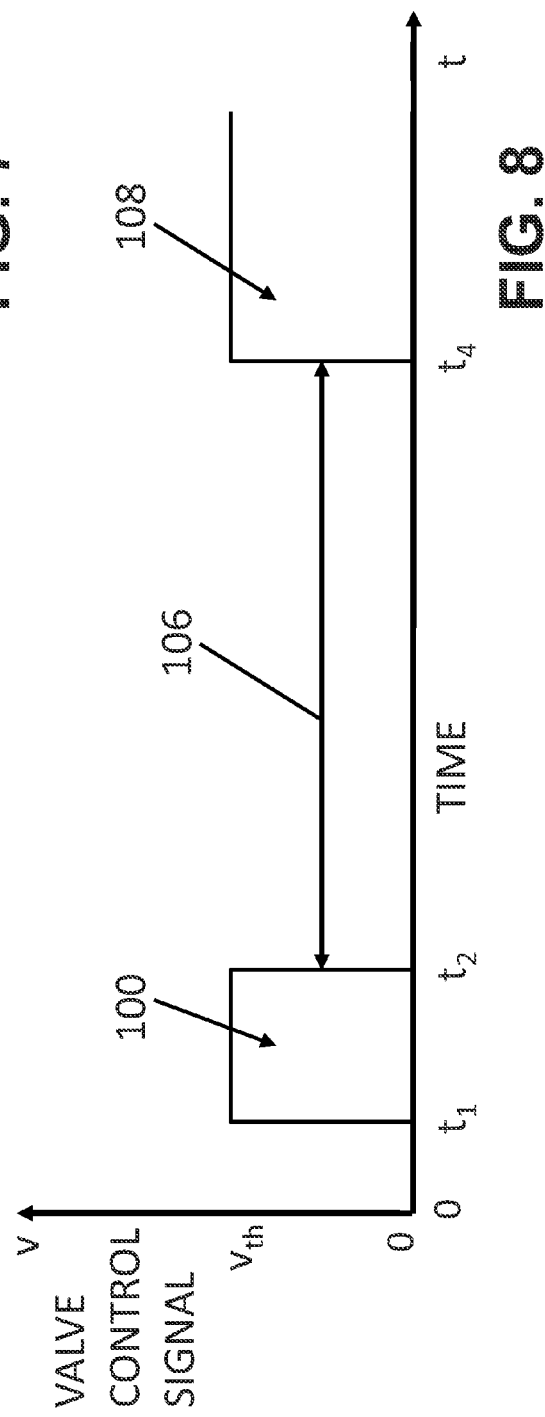

FIGS. 7 and 8 show exemplary embodiments for providing an indication to the user of a low battery warning condition and low battery alert condition. FIG. 7 illustrates a time delay and pulsing signal when a low battery warning condition is detected at block 88. Controller 24 provides an initial pulse 100 to open valve 22 between time $t_1$ and $t_2$. The valve 22 is shut off between time $t_2$ and $t_3$ to provide delayed actuation of the fluid supply during a first time period illustrated by double headed arrow 102. At time $t_3$, controller 24 opens the valve 22 as illustrated at location 104 to provide fluid flow until controller 24 receives an indication from sensors 40 to close the valve 22.

When controller determines a low battery alert condition exists in which the battery level is lower than the low battery warning level, controller 24 provides an even longer time delay before the actuator driven valve 22 is opened in response to input signals from the sensors 40. As shown in FIG. 8, the controller 24 provides an initial pulse 100 of water between time $t_1$ and $t_2$. Controller 24 then closes the valve 22 from time $t_2$ to time $t_4$ to provide a delay illustrated by double headed arrow 106 shown in FIG. 8 which is greater than the delay 102 shown in FIG. 7. At time $t_4$, controller 24 opens the valve 22 as illustrated at location 108 until controller 24 receives an indication from sensors 40 to close the valve 22.

These time delays before opening the valve 22 provide a nuisance to encourage a user to replace or recharge the battery. Such nuisance is harder to ignore than conventional warning lights or audible tones, thereby encouraging the user to replace the battery or complete the other indicated maintenance or service operation. In an illustrated embodiment, the user may shut off the pulsation/delay notification feature for a certain time, a certain number of uses, or permanently, if desired.

As discussed above, instead of lengthening the time delay, the controller 24 may provide a different series of pulses to indicate a low battery warning condition or a low battery alert condition. For example, three pulses 68 shown in FIG. 4 may be used to provide a low battery warning indication and the series of six pulses 72 shown in FIG. 5 may be used to provide a low battery alert indication.

Figure 9:
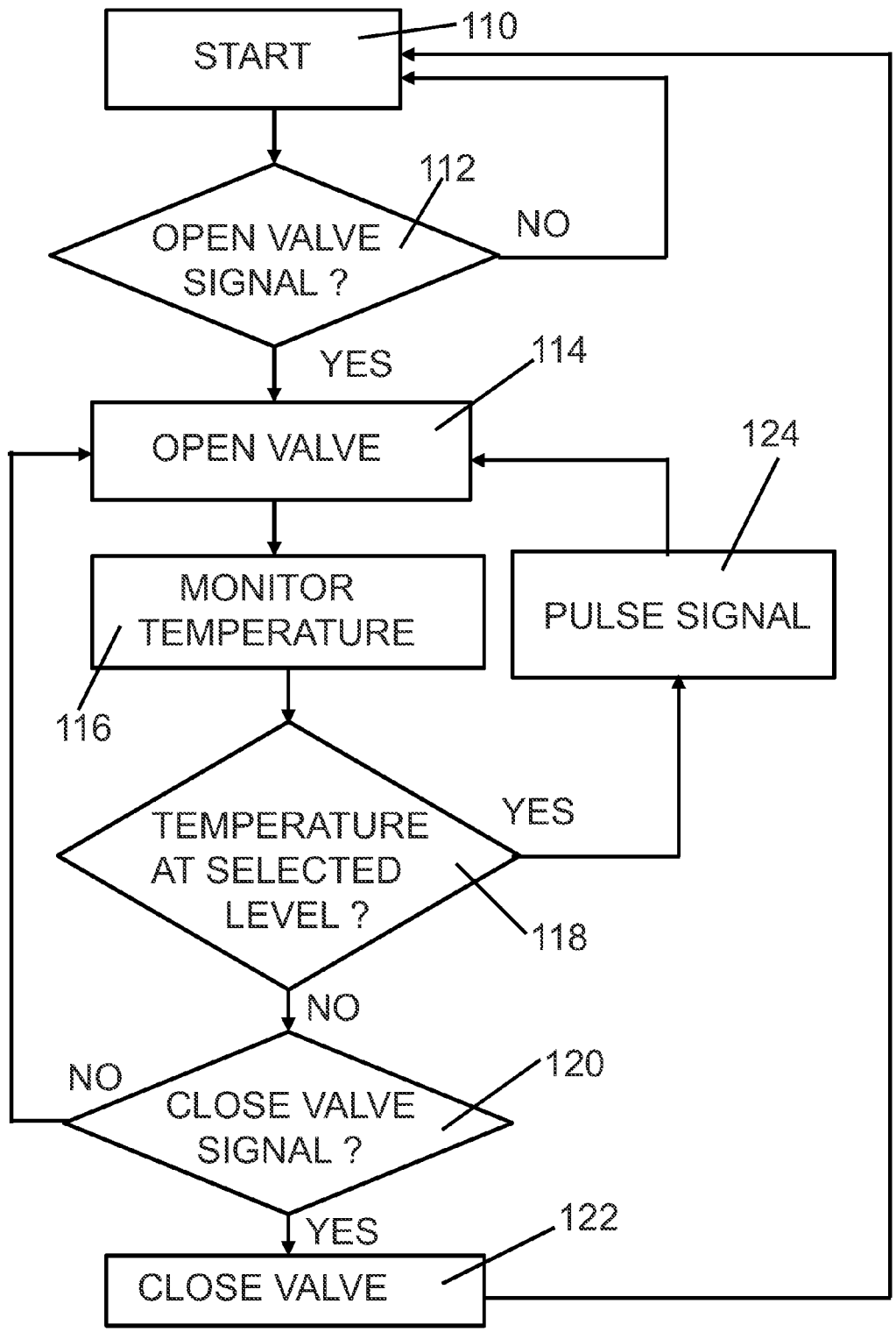
FIG. 9 is a flow chart illustrating steps performed by the electronic faucet to monitor temperature of fluid flowing through the faucet and provide an indication to the user regarding the temperature.

FIG. 9 illustrates operation of the controller 24 to monitor temperature of fluid flowing through the faucet 10 and provide an indication to the user when the fluid temperature reaches a preselected level. Operation begins at block 110. Controller 24 monitors sensors 40 for a signal to open the actuator drive valve 22 as illustrated at block 112. If no such signals are received, controller 24 returns to block 110. If suitable signals are received from sensors 40, controller 24 opens the actuator driven valve 22 as illustrated at block 114 to initiate fluid flow from the fluid supply 42 through the spout 12.

Controller 24 then monitors a temperature reading from temperature sensor 44 as illustrated at block 116. Controller 24 determines whether the temperature from sensor 44 has reached a selected level, preprogrammed or entered by the user, as illustrated at block 118. If the temperature has not reached the selected level at block 118, controller 24 monitors sensors 40 to look for an indication to close the valve 22 as illustrated at block 120. If the controller 24 does not receive an indication to close the valve at block 120, controller 24 continues to monitor the fluid temperature until the temperature reaches the selected level at block 118. If controller 24 receives an indication from sensors 40 to close the valve at block 120, the valve 22 is closed as illustrated at block 122. Controller 24 then returns to block 110 to wait for the next signal to open the valve.

Once the temperature reaches the selected level at block 118, controller 24 provides a pulse signal to open and close the actuator driven valve 22 in a predetermined pattern as illustrated at block 124. This predetermined pattern provides an indication to the user that the temperature has reached a preselected level.

While this disclosure has been described as having exemplary designs and embodiments, the present invention may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains. Therefore, although the invention has been described in detail with reference to certain illustrated embodiments, variations and modifications exist within the spirit and scope of the invention as described and defined in the following claims.

The invention claimed is:

1. A method of controlling fluid flow from an electronic faucet having a spout, a passageway configured to conduct fluid flow through the spout, and an electrically operable valve in fluid communication with the passageway, the method comprising: monitoring at least one maintenance condition of the electronic faucet; receiving a signal to control the valve and fluid flow through the passageway; and controlling opening and closing of the valve in response to the signal to generate a fluid flow pattern through the passageway that provides an indication to a user of an existing maintenance condition for the electronic faucet, wherein the fluid flow pattern includes at least one of:
a time delay between receipt of the signal and controlling the valve, the time delay providing an indication to the user of the existing maintenance condition, and
a plurality of fluid pulses having a pattern indicative of the existing maintenance condition.

2. The method of claim 1, wherein the electronic faucet includes a battery power supply and the at least one monitored maintenance condition includes a battery level of the battery, the fluid flow pattern providing an indication to the user when the battery level falls below a predetermined level.

3. The method of claim 2, wherein the controlling step opens and closes the valve in a first pattern to indicate a low battery warning condition and a second pattern to indicate a low battery alert condition, the battery level being lower for the low battery alert condition than for the low battery warning condition.

4. The method of claim 3, further comprising locking out operation of the electronic faucet when the battery level falls below a predetermined lockout battery level which is lower than the low battery alert battery level.

5. The method of claim 3, wherein, after receipt of the signal to open the valve, the controlling step provides a first time delay before opening the valve when a low battery warning level condition exists and a second time delay before opening the valve when a low battery alert level condition exists, the second time delay being longer than the first time delay.

6. The method of claim 1, further comprising monitoring a temperature of the fluid flowing through the passageway, and wherein the controlling step opens and closes the valve to provide a plurality of fluid pulses to indicate that the temperature of the fluid has reached a selected level.

7. The method of claim 1, wherein the at least one monitored maintenance condition includes the need to replace a fluid filter of the electronic faucet.

8. The method of claim 1, wherein the controlling step provides at least one of a time delay and pulsation of fluid flow through the passageway to provide a nuisance to the user to encourage the user to attend to the maintenance condition.

9. The method of claim 1, further comprising providing at least one sensor configured to detect an input from a user and to generate the signal to open the valve.

10. The method of claim 9, wherein the at least one sensor includes a proximity sensor configured to detect a user's hands adjacent the electronic faucet.

11. The method of claim 9, wherein the at least one sensor includes a touch sensor.

12. The method of claim 9, wherein the at least one sensor includes a capacitive sensor.

13. The method of claim 9, wherein the at least one monitored maintenance condition includes a condition of the at least one sensor, and the controlling step provides an indication to the user when the at least one sensor needs maintenance.

14. The method of claim 1, wherein a plurality of different maintenance conditions are monitored during the monitoring step, and the controlling step provides a different fluid flow pattern for each of the different monitored maintenance conditions.

15. An electronic faucet comprising: a spout; a passageway configured to conduct fluid flow through the spout; an electrically operable valve in fluid communication with the passageway; and a controller coupled to the valve, the controller being configured to selectively open and close the valve to provide fluid flow through the valve and the passageway of the spout, the controller being programmed to monitor a maintenance condition of the electronic faucet and to selectively open and close the valve to generate a fluid flow pattern through the passageway to provide an indication to a user of an existing maintenance condition, wherein the fluid flow pattern includes at least one of:

a time delay between receipt by the controller of a signal to open or close the valve and the controller actually opening or closing the valve, the time delay providing an indication to the user of the existing maintenance condition, and a plurality of fluid pulses having a pattern indicative of the existing maintenance condition.

16. The faucet of claim 15, further comprising a manual valve located in series with the electrically operable valve, and a manual handle configured to control the manual valve.

17. The faucet of claim 15, further comprising at least one on/off sensor coupled to the controller, the controller being configured to open and close the valve in response to signals received from at least one on/off sensor.

18. The faucet of claim 17, wherein the at least one on/off sensor includes a proximity sensor configured to detect a user's hands adjacent the electronic faucet.

19. The faucet of claim 17, wherein the at least one on/off sensor includes a touch sensor.

20. The faucet of claim 17, wherein the at least one on/off sensor includes a capacitive sensor.

21. The faucet of claim 17, wherein the at least one monitored maintenance condition includes a condition of the at least one on/off sensor, the controller being programmed to provide a fluid flow pattern indication to the user when the at least one on/off sensor needs maintenance.

22. The faucet of claim 15, further comprising a battery power supply for the electronic faucet, and wherein the at least one monitored maintenance condition includes a battery level of the battery, the fluid flow pattern providing an indication to the user when the battery level falls below a predetermined level.

23. The faucet of claim 22, wherein the controller opens and closes the valve in a first pattern to indicate a low battery warning condition and a second pattern to indicate a low battery alert condition, the battery level being lower for the low battery alert condition than for the low battery warning condition.

24. The faucet of claim 22, wherein, after receipt of a signal to open the valve, the controller provides a first time delay before opening the valve when a low battery warning condition exists and a second time delay before opening the valve when a low battery alert condition exists, the second time delay being longer than the first time delay.

25. The faucet of claim 15, further comprising a temperature sensor to monitor a temperature of the fluid flowing through the passageway, and wherein the controller is programmed to open and close the valve to provide a plurality of fluid pulses to indicate that the temperature of the fluid has reached a selected level.

26. The faucet of claim 15, further comprising a fluid filter in fluid communication with the passageway, and wherein the at least one monitored maintenance condition includes the need to replace the fluid filter.

27. The faucet of claim 15, wherein the controller is programmed to provide at least one of a time delay and pulsation of fluid flow through the passageway to provide a nuisance to the user to encourage the user to attend to the maintenance condition.

28. The faucet of claim 15, wherein a plurality of different maintenance conditions are monitored by the controller, and the controller is programmed to generate a different fluid flow pattern for each of the different monitored maintenance conditions.

29. The faucet of claim 15, wherein the fluid flow pattern provides an indication of at least one of a fault code and an error code for the electronic faucet.

* * * * *